UNITED STATES PATENT OFFICE.

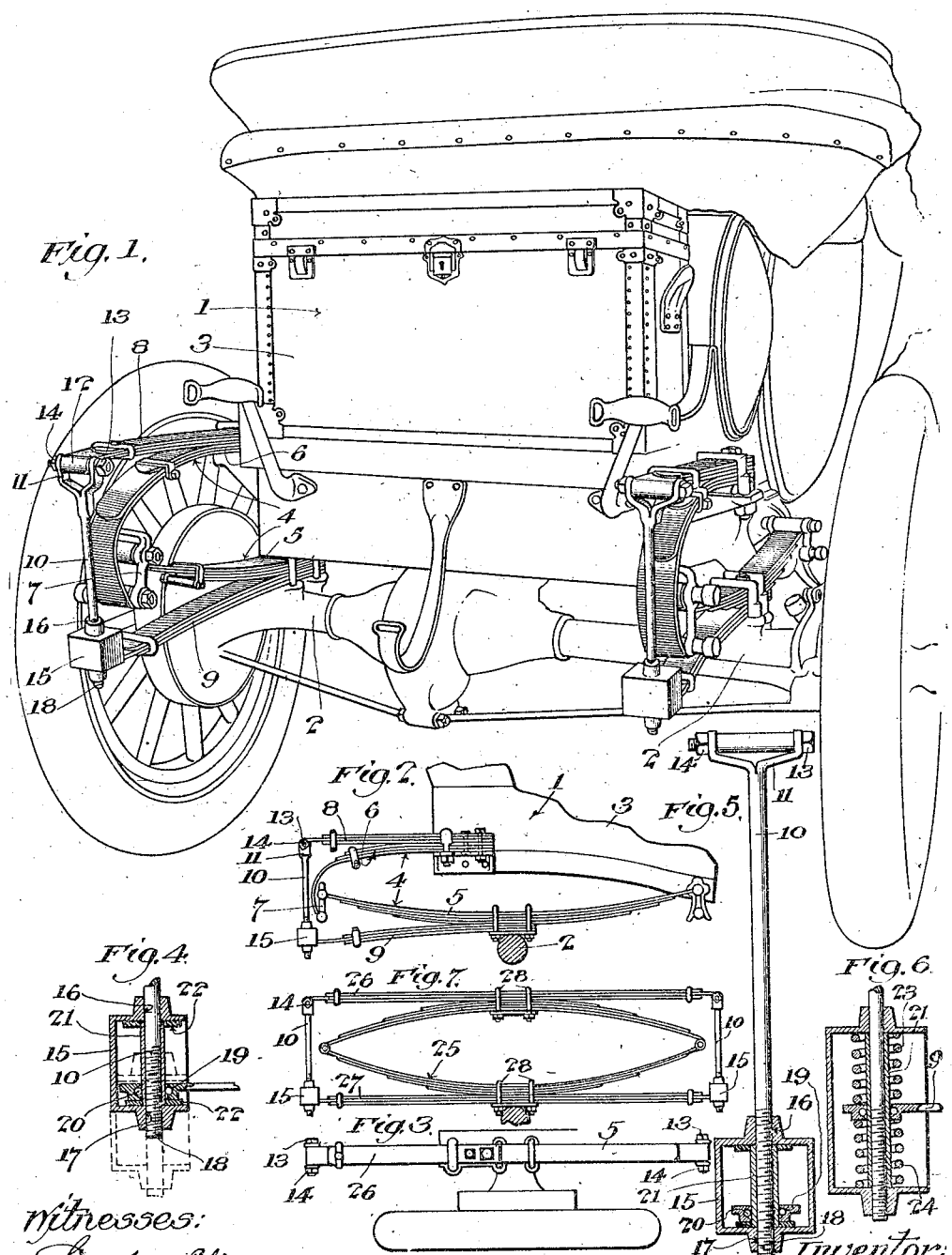

CLABEORN P. RANDOLPH, OF LOS ANGELES, CALIFORNIA.

VEHICLE-SPRING.

1,202,099.  Specification of Letters Patent.  Patented Oct. 24, 1916.

Application filed February 11, 1915. Serial No. 7,523.

*To all whom it may concern:*

Be it known that I, CLABEORN P. RANDOLPH, a citizen of the United States, residing at Los Angeles, in the county of Los Angeles and State of California, have invented a new and useful Vehicle-Spring, of which the following is a specification.

This invention relates to vehicle springs, and has for its main object to provide a spring so designed that it will be more efficient and cushion a load better on both the upward and downward movement than any spring heretofore invented.

Another object of the invention is to provide a vehicle spring of this type wherein the auxiliary springs will carry the load in case the main spring weakens, breaks or becomes defective in any manner.

A further object of the invention is to provide auxiliary springs operating in conjunction with the main spring and means to adjust the tension of the auxiliary springs so that the load will be easily carried and so that the recoil will be properly taken care of.

Another object of the invention is to provide a vehicle spring which may be adjusted so as to keep the car level.

The invention also contemplates the provision of a vehicle spring having a main spring which is sufficiently strong to support a normal load and having auxiliary springs which are brought into play when an abnormal load is to be carried or when there is an excessive recoil such as is caused by rough roads.

The invention also aims to generally improve vehicle springs to render them more practical, durable and commercially desirable.

With these, and other objects in view, the invention consists in certain novel features of construction, combination and arrangement of parts as will be fully described, illustrated and claimed.

In the drawings: Figure 1 is a perspective view illustrating the rear end of a vehicle equipped with my improved springs; Fig. 2 is a side elevation illustrating a three-quarter elliptic spring constructed in accordance with my invention; Fig. 3 is a top plan view of the three-quarter elliptic spring showing the same connected to an axle; Fig. 4 is a detail sectional view showing the construction employed for securing the terminals of the lower auxiliary springs; Fig. 5 is an enlarged detail view partly in elevation and partly in section showing a connecting rod employed to join two auxiliary springs and a casing carried by the connecting rod; Fig. 6 is a detail sectional view showing how cushioning springs may be used within a casing; Fig. 7 is a side elevation of a full elliptic spring constructed in accordance with my invention.

Referring in detail to the drawings by numerals: 1 designates as an entirety an automobile having an exle 2 and a body 3. My improved three-quarter elliptic spring which is illustrated in operative position comprises a main spring 4 having a lower section 5 formed of a plurality of full length leaves and an upper section 6 formed of a plurality of half length leaves. The upper and lower sections are connected at their terminals by a suitable coupling 7 and the sections are so arranged that the inner end of the upper section terminates practically over the central portion of the lower section.

A pair of auxiliary springs 8 and 9 are connected at their inner ends to the upper and lower sections of the main spring and said auxiliary springs lie in the same vertical plane as the main spring. The upper auxiliary spring 8 is here shown as being formed of three leaf springs, the central one of which is somewhat longer than the others and extended beyond the outer ends thereof. The lower auxiliary spring 9 is also shown as being formed of three leaves with the central leaf extended at one end beyond the terminals of the other leaves. It will be understood that I do not wish to be limited to the use of any particular number of leaves in either the main spring or the auxiliary springs.

To connect the two auxiliary springs I provide a connecting rod 10 having its upper end bifurcated to form the arms 11. An eye 12 is formed on the long leaf of the upper auxiliary spring 8 and fits between the arms 11 of the rod 10, being held therein by a transverse bolt 13 and nut 14. The bolt passes through the arms 11 and through the eye 12 and forms a pivotal connection between the spring leaf and the rod 10.

A case or housing 15 is connected to the lower end of the rod 10 by passing the rod through an opening 16 formed in the top of the housing and through an opening 17 formed in the bottom of the housing, the latter opening being threaded to engage the threaded end 18 of the rod 10. This housing is closed on three sides and has its inner side open so that the extended leaf of the lower auxiliary spring 9 may project therein. This leaf is formed with an opening 19 in its outer terminal through which the rod 10 extends and in this opening are arranged a plurality of ball bearings 20. A sleeve 21 encircles the rod 10 within the casing 15 and the balls 20 work against this sleeve. Washers 22 of any suitable material such as rubber or leather are arranged within the casing 15 at the top and bottom thereof to act as stops or bumpers for the outer end of the auxiliary spring 9. Thus it is seen that the rod 10 and the housing 15 together form rigid adjusting means whereby the relative positions of the body and axle may be adjusted and maintained; and that said rod and housing together with the spring 8 form a lost motion connection between the spring 9 and body 3; and that said rod and housing together with the spring 9 form a lost motion connection between the spring 8 and axle 2.

In Fig. 6 I show helical springs 23 and 24 which may be used in place of the washers 22 desired. These springs encircle the sleeve 21 and are arranged on opposite sides of the spring 9 as clearly shown.

The main spring 5 is made of sufficient strength to properly support a normal load without bringing the auxiliary springs 8 and 9 into play. When, however, the load is too great to be carried entirely by the main spring 5 the excess weight is carried by the auxiliary springs and the operation of the spring is as follows: When the two sections of the main spring are compressed or forced toward one another the upper auxiliary spring 8 will be carried toward the lower auxiliary spring 9 and will carry the connecting rod 10 and casing 15 downwardly. When the casing 15 has been moved sufficiently far to bring a pressure against the outer terminal of the lower auxiliary spring both of the auxiliary springs will be brought into action and, if any of the spring leaves should break, the clip at the break will prevent the broken parts separating and consequently weakening the spring or even letting the body of the vehicle down as would occur if the master leaf or leaves should break. When an excessive recoil takes place the main spring 4 will be expanded and the auxiliary springs will move away from one another until checked by the connecting rod 10 and casing 15. The tension of the auxiliary springs may be adjusted by changing the relative position of the connecting rod 10 and casing 15. This change may be made easily by removing the bolt 13, swinging the bifurcated upper end of the connecting rod 10 away from engagement with the upper auxiliary spring and then turning said rod about its longitudinal axis. The threaded end 18 of the rod will, when said rod is rotated, cause the rod to be moved toward or away from the casing 15. After the proper adjustment has been made the connecting rod may be again secured to the upper auxiliary spring 8 by means of the bolt 13 and nut 14.

In Fig. 7 I have shown the adaptation of my invention to a full elliptic spring. Here the main spring 25 is formed of two sections of equal length and each section composed preferably of a plurality of leaf springs as shown. Auxiliary springs 26 and 27 formed preferably of a plurality of leaves are connected at their central points to the central points of the main spring 25 by means of suitable fasteners such as indicated by the numeral 28. In this form the auxiliary springs are extended beyond both ends of the main elliptic spring 25 and the corresponding terminals of the auxiliary springs are connected by rods 10 and casings 15 in the same manner employed in conjunction with the three-quarter elliptic spring previously described.

The connecting means which I employ for securing the auxiliary springs to each other form an essential feature of my invention. Should the main spring become broken the load will be carried by the auxiliary springs and the car may be leveled up by lengthening the connection between the auxiliary springs to spread them apart. When it is desired to increase the tension on the auxiliary springs it is only necessary to shorten the connection between said springs by threading the casing 15 toward the upper end of the connecting rod 10.

From the foregoing description taken in connection with the accompanying drawings, it will be apparent that I have provided a very strong and reliable vehicle spring which will cause a vehicle to ride easily under all road and load conditions.

While I have shown and described the preferred embodiments of my invention, it will be understood that minor changes of construction and arrangement of parts may be made without departing from the spirit and scope of the invention as claimed.

What I claim is:

1. In combination with a vehicle body, an axle, a main spring connecting said body to the axle, an auxiliary spring extending beyond one end of the main spring and connected to the axle, means connected to the vehicle body, and a rod having connections with said means and auxiliary spring, one of said connections being a loose connection so as to permit lost motion to take place when the main spring is compressed and expands.

2. A vehicle spring comprising a main spring having two opposed sections, an auxiliary spring connected to each of said sections, and an adjustable rod connecting the ends of said auxiliary springs to each other, said adjustable rod being capable of adjusting the spring to the desired resiliency.

3. In combination with a vehicle body, an axle, a main spring connecting said body to the axle, an auxiliary spring extending beyond one end of the main spring and connected to the vehicle body, means connected to the axle, and a rod having connections with said means and auxiliary spring, one of said connections being a loose connection so as to permit lost motion to take place when the main spring is compressed and expands.

4. A vehicle spring comprising a main spring having opposed sections adapted to move toward and away from each other, an auxiliary spring attached to each of said sections and extending longitudinally thereof, and a connecting rod pivotally attached to one of said auxiliary springs, the connecting rod having a sliding attachment to the other of said auxiliary springs.

5. A vehicle spring comprising a main spring having two sections, an auxiliary spring connected to each of said sections and extending longitudinally thereof, each of said auxiliary springs having a free terminal, a connecting rod pivotally secured to the free terminal of one of said auxiliary springs, a casing carried by said connecting rod to receive the free terminal of the other of said auxiliary springs, the connecting rod extending through said casing and the last mentioned auxiliary spring being formed with an opening to receive said connecting rod.

6. A vehicle spring comprising a main spring having a pair of opposed sections, an auxiliary spring connected to the outer side of each of said sections, the auxiliary springs projecting beyond one end of the main spring, a connecting rod, means pivotally connecting said rod to one of the auxiliary springs, a casing, the other auxiliary spring projecting into said casing and being formed with an opening, the connecting rod extending through the casing and through said opening, and means within the casing to cushion the action of the auxiliary spring within the casing.

In testimony whereof, I have hereunto set my hand at Los Angeles, California, this 28th day of January 1915.

CLABEORN P. RANDOLPH.

In presence of—
 ANNA F. SCHMIDTBAUER,
 LORA M. BOWERS.